May 28, 1974 A. H. BOONSTRA ET AL 3,813,292

METHOD OF DOPING THE SURFACE OF A METAL-OXYGEN COMPOUND

Filed March 1, 1972 2 Sheets-Sheet 1

United States Patent Office 3,813,292

Patented May 28, 1974

3,813,292
METHOD OF DOPING THE SURFACE OF A METAL-OXYGEN COMPOUND

Alexander Hendrik Boonstra, Paulus Phillippus Maria Schampers, and Adriaan Netten, Emmasingel, Eindhoven, Netherlands, assignors to U.S. Philips Corporation, New York, N.Y.

Filed Mar. 1, 1972, Ser. No. 230,695
Claims priority, application Netherlands, Mar. 6, 1971, 7103016
Int. Cl. B44d *1/14, 1/18*
U.S. Cl. 117—215 10 Claims

ABSTRACT OF THE DISCLOSURE

Doping of the surface of a metal-oxygen compound by exposure to and chemisorption of a reactive gas comprising an oxygen-replacing element is effected at such a low temperature that the adsorbed gas is not decomposed. A correct quantity of reactive gas being adsorbed then leads to discrete adsorption densities of less than 1. Used for shifting the photosensitivity of a lead monoxide target plate for a camera tube of the vidicon type to longer wavelengths.

Figure 1:
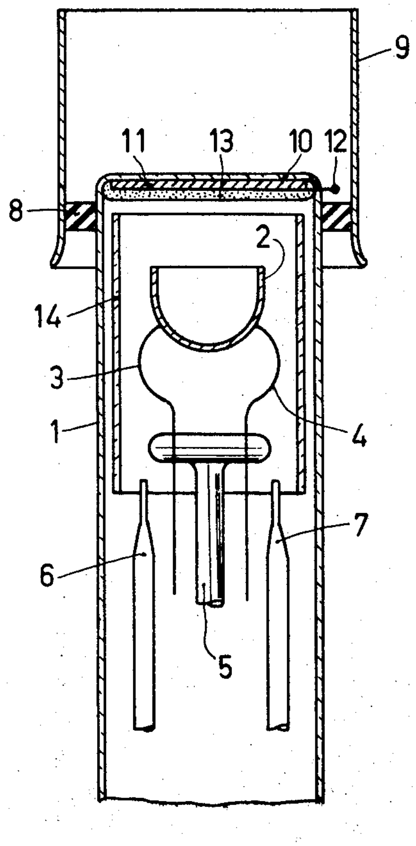

The invention relates to a method of doping a layer mainly consisting of a metal-oxygen compound with an element replacing oxygen at the surface of the metal-oxygen compound by means of chemisorption of a reactive gas including the replacing element, and to a layer thus doped.

The invention is of particular significance for doping photosensitive layers in the manner described so as to improve their photosensitivity and/or to widen the spectral sensitivity range. A known example of such a doping method is the exposure at normal temperature (room temperature or slightly higher) of a layer of lead monoxide (PbO) vapor-deposited in an oxygen-containing low-pressure atmosphere and consequently being porous, to a gaseous compound of hydrogen and sulphur, selenium or tellurium or a mixture of these compounds. The lead monoxide layer is doped to a given depth with these elements. Without such a doping process the long-wave range of the spectral sensitivity of the lead monoxide layer is located at approximately 6300 a., that is to say, at a smaller wave length than the human eye is sensitive to (7000 a.). Extension of the spectral sensitivity to the red part of the spectrum reaching as far as infrared is obtained by the above-mentioned doping process. The red sensitivity then obtained is important, for example, when the lead monoxide layer is used as a photoconducting target plate in a camera tube of the vidicon type when used for color television, namely for the red channel. The said known method of doping a layer of lead monoxide with sulphur, selenium or tellurium has the drawback that the boundary of the red sensitivity is shifted to much longer wavelengths than is often desired. Consequently, in television recordings employing a camera tube which includes a lead monoxide target plate doped in this manner red and infrared absorbing filters are often used to avoid disturbing influences of light outside the visible spectrum. A further drawback of the known method of doping is that relatively slight variations in the doping quantities lead to differences in the doping depth which may result in unwanted variations in the optical and electrical properties of the layer.

An object of the doping method according to the present invention is to obviate these drawbacks and is based on the discovery that the adsorption of the gaseous compound is to be prevented from immediately giving rise to a too high adsorption density on the surface of the metal oxygen compound and that this can be realized by causing the gaseous compound to be adsorbed by the layer exclusively at a temperature below that at which decomposition—i.e., exchange of oxygen atoms of the surface with atoms of the oxygen-replacing element—of the adsorbed compound is effected.

The method according to the invention involves limiting the adsorption of the reactive gas to a sub-unilayer as defined hereinafter the layer of the metal-oxygen compound being exposed to the reactive gas at such a low temperature that decomposition of the reactive gas being adsorbed by the surface of the metal-oxygen compound does not occur and that a smaller quantity of reactive gas is applied to the layer of the metal oxygen compound than would be required for the formation of a unilayer or monolayer (as defined hereinafter) on the entire surface of the metal-oxygen compound, while only after the desired quantity of reactive gas is adsorbed the metal-oxygen compound, without any further contact with the reactive gas, is brought to at least such a higher temperature that under decomposition of the adsorbed reactive gas the oxygen-replacing element starts to replace oxygen locally from the metal-oxygen surface the oxygen thus replaced being released in the form of a gaseous oxygen compound.

Within the scope of the present invention the expressions unilayer and subunilayer are understood to mean an adsorbed layer of the reactive gas having an adsorption density $\varphi$ which is equal to or substantially equal to 1 or is clearly less than 1. In this connection the adsorption density $\varphi$ is understood to mean the local ratio between the number of reactive gas molecules adsorbed per original surface molecule of the metal oxygen compound and the number of reactive gas molecules required per surface molecule to entirely replace the oxygen of such a surface molecule. The average adsorption density $\bar{\varphi}$ at the surface of the metal oxygen compound is understood to mean the ratio between the total number of reactive gas molecules adsorbed through the entire surface of the metal oxygen compound and the number of molecules of this reactive gas which would have been required to replace the oxygen of all surface molecules of the metal oxygen compound.

A further feature to be used within the scope of the present invention is the substitution degree S which is understood to mean the local ratio, existing after the exchange of oxygen-oxygen replacing element at the surface of the metal oxygen compound, between the number of replaced oxygen atoms and the sum of the number of replaced and the number of non-replaced oxygen atoms.

It is to be noted that the definitions of the adsorption density and hence those of a unilayer and a subunilayer are related to the original, uncovered, i.e. untreated surface of the metal oxygen compound, while the definition of the substitution degree is related to the surface after treatment, that is to say, after the exchange reaction. Differences between adsorption density and the associated substitution degree are the result of changes found by the Applicants in the effective area of the surface of the metal oxygen compound as a result of the gas adsorption and exchange reaction.

The method according to the invention may particularly be used for layers which consist of lead monoxide (PbO). Preferably, the layer to be doped in the manner according to the invention is obtained by vapor deposition of the metal oxygen compound on a substrate in an oxygen-containing gas atmosphere in which the pressure of the gas atmosphere and the temperature of the substrate are chosen to be such that the layer becomes porous and polycrystalline.

In a preferred embodiment of the method according to the invention and intended for the manufacture of the target plate of a television camera tube of the vidicon type, a layer obtained by vapor deposition of lead monoxide on the face plate of the tube is exposed to a gas atmosphere comprising hydrogen sulphide as a reactive gas, and this at a temperature of the layer which is lower than −90° C., preferably a temperature of approximately −120° C.

In a further embodiment of the method according to the invention a layer obtained by vapor deposition of lead monoxide on the face plate of the tube is exposed to a gas atmosphere comprising hydrogen selenide as a reactive gas, and this at a temperature of the layer which is lower than −155° C.

In the two last-mentioned preferred embodiments it is advantageous to ensure that the quantity of reactive gas to which the lead monoxide layer is exposed is not more than approximately 25% of the quantity which is sufficient to coat the entire surface with a unilayer.

Furthermore it may be advantageous, as in a further embodiment of the method according to the invention, to expose the layer firstly to a gas atmosphere comprising as a reactive gas a hydrogen compound of a first oxygen-replacing element and subsequently to a gas atmosphere comprising as a reactive gas a hydrogen compound of another oxygen-replacing element, the quantity of each of the two reactive gases being less than is exactly required for the formation of a unilayer on the surface of the metal oxygen compound, whilst furthermore the temperature of the layer, when exposed to the hydrogen compound comprising the first oxygen-replacing element, is so low that the compound being absorbed on the layer is not decomposed.

The invention will now be described with reference to the accompanying drawing in which FIG. 1 serves to illustrate an embodiment of the method according to the invention when being used for the manufacture of a target plate mainly consisting of lead monoxide for a television camera tube of the vidicon type.

Figure 2:
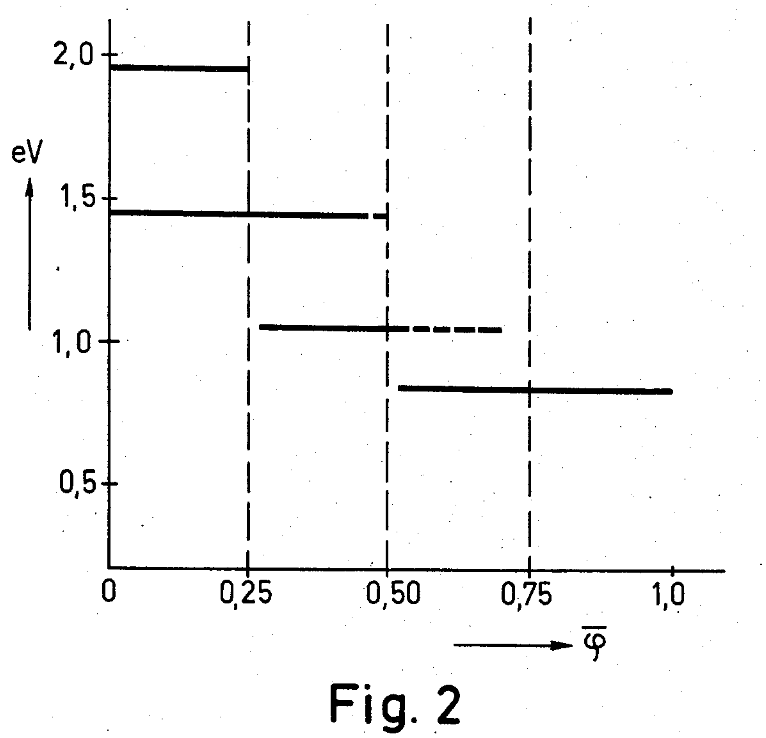
Figure 3:
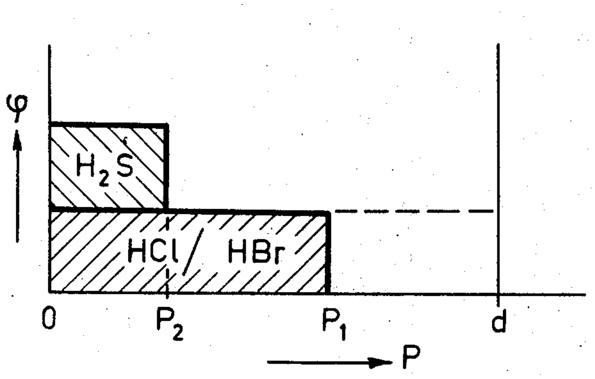

FIG. 2 shows the optical adsorption side (optical adsorption coefficient $\alpha=0$) extrapolated from transmission and reflection measurements for different quantities of hydrogen sulphide on the lead monoxide layers doped in accordance with the method according to the invention, while FIG. 3 illustrates how the adsorption density on a porous layer as a function of the location in the layer may be represented when in conformity with an embodiment of the invention doping is effected by exposing the layer to two different reactive gases.

FIG. 1 diagrammatically shows a part of an arrangement with which a layer of lead monoxide is vapor-deposited on the inside, provided with a signal electrode 11, of the face plate 10 of a cylindrical glass envelope 1 (later to form the envelope of a camera tube of the vidicon type) and with which subsequently the surface of this layer is doped by means of exposure to a reactive gaseous compound.

The envelope 1 is placed on and connected to a tube (not shown) of a vacuum pumping system. A vapor-deposition vessel 2 is placed within the envelope, facing the face plate 10 and is supported by two supporting wires 3 and 4 jointly functioning as a thermal element and being secured in a glass support 5. Two capillaries 6 and 7 passed in a manner not shown through the wall of the system of stems terminate within the envelope 1 while various gases can be admitted through these capillaries to the envelope 1 in the form of a regulated constant stream taking a given period of time. A collar 9 sealed by means of a rubber ring 8 adjoining the envelope 1 is placed about the upper side of envelope 1.

The inner side of face plate 10 is provided with a transparent conducting signal electrode 11 which may consist of, for example, conducting tin oxide or indium oxide to which a current supply conductor 12 leading out of the envelope is connected. During the phase preceding the condition shown in FIG. 1 a quantity of lead monoxide (PbO) provided in the platinum crucible 2 is caused to melt by means of high-frequency heating of said crucible and is subsequently evaporated so that a layer of lead monoxide 13 of, for example, approximately 10 to 20 microns thick is deposited on the signal electrode 11. During vapor deposition of layer 13 the face plate 10 is maintained at a substantially constant temperature of approximately 120° C. by means of a suitable liquid, for example, glycerine in the collar 9. Vapor deposition of lead monoxide from the crucible 2 on the signal electrode 11 is effected in a low-pressure atmosphere comprising oxygen and water vapor. This atmosphere may be obtained by regular supply of oxygen and water vapor through the capillaries 6 and 7 while the system of stems to which the envelope 1 is connected, is operating. The supply and removal of gases to and from the envelope 1 is regulated preferably in such a manner that during vapor deposition the partial pressure of oxygen in the envelope is approximately $5\times10^{-3}$ torr and that of water vapor is approximately $2\times10^{-3}$ torr. To limit vapor deposition of PbO to the face plate 10, a cylinder 14 covering the inner side of the envelope 1 is used whose support is not shown in FIG. 1. The lead monoxide layer 13 has a yellowish appearance and a porous structure (porosity approximately 50%) after vapor deposition under the circumstances mentioned above. The layer is polycrystalline having plate-shaped crystallites being at right angles to the face plate 10 and having a very small thickness.

After vapor deposition of the layer 13 the envelope 1 is removed perpendicularly from the pumping system while using a shielding gas, preferably helium which is brought to atmospheric pressure or slightly above atmospheric pressure in the envelope and the envelope is then transferred to a second pumping system which differs from the first system in that there is no vapor deposition crucible 2 and shielding cylinder 14. A further possibility is to replace the envelope on the first pumping system after the cylinder 14 and the support 5 with the vapor deposition crucible 2 are removed. The envelope 1 is then evacuated and subsequently the size of the lead monoxide surface of the layer 13 is determined by means of the method known as the BET method (described by Brunauer and others in Journal of American Chemical Society, *60*, 309, 1938), if this size is not known from other methods or cannot be deduced from the circumstances. Since, as stated above, the layer 13 is porous and is built up from very thin crystallites, the lead monoxide surface of the layer 13 is considerably larger than the geometrical surface of the layer.

The applicants have found that for lead monoxide under the above-mentioned circumstances, the vapor-deposited surface is substantially 40 sq.m. per gram of lead monoxide.

Subsequently, the layer 13 in the envelope 1, after its evacuation, is exposed to a reactive gas including an element which is capable of replacing oxygen from the lead monoxide surface. Examples of such reactive gases are the hydrogen halides and the hydrogen compounds of sulphur, selenium and tellurium. During this exposure the temperature of the layer 13 is to be maintained low such that the reactive gas being adsorbed by lead monoxide is not decomposed and therefore remains as such on the lead monoxide surface at this temperature. This exposure is furthermore effected in such a manner that a measured quantity of the reactive gas is adsorbed by the lead monoxide layer which quantity is less than would be required to coat the entire lead monoxide surface with a unilayer as defined hereinbefore.

The applicants have found that for a normal temperature, i.e. room temperature the adsorption of the previously mentioned hydrogen compounds by lead monoxide already immediately leads to at least the formation of a unilayer (as defined hereinbefore) which starts on the outer surface—that is to say, the side facing the space containing the hydrogen compound—of the layer 13 and extends more in the direction of thickness of the layer as there is a greater quantity of hydrogen compound for adsorption available. When the temperature of the layer is maintained low during adsorption to such an extent that there is no decomposition of the adsorbed compound, the adsorption is found to occur in stages. Firstly, a sub-unilayer (as defined hereinbefore) is formed with a constant, generally comparatively low adsorption density which extends further and further away from the outer surface of the layer 13 in the direction of thickness thereof as a greater quantity of the reactive gas is available for adsorption. Once the entire lead monoxide surface is coated with this subunilayer, and again starting from the outer surface of the layer 13 and penetrating the layer deeper and deeper, further adsorption of the reactive gas (if available) leads to the formation of either one or more subunilayers, each increasing in adsorption density, or one unilayer.

By suitably determining the quantity of reactive gas to be adsorbed by the layer 13 it is possible to provide the lead monoxide surface entirely or over a given part of the thickness of the lead monoxide layer with a subunilayer having a constant adsorption density determined by the given combination of metal oxygen compound-reactive gas.

The applicants have found that the following combinations of lead monoxide (vapor-deposited as described hereinbefore)-reactive gas may lead to subunilayers with the adsorption densities stated in the table below, provided that at least in case of adsorption for the purpose of forming the subunilayer having the lowest adsorption density the temperature at which the adsorption is effected is not higher than the temperature T (in ° C.) indicated in the last column of the table.

| Combination | Adsorption density | Substitution degree S | T in ° C. |
|---|---|---|---|
| PbO-$H_2S$ | ~0.25 resp. ~0.50 | ~0.25 resp. ~0.50 | −90 |
| PbO-$H_2Se$ | ~0.25 | ~0.25 | −160 |
| PbO-HCl | ~0.28 resp. ~0.50 | ~0.5 resp. ~1 | −170 |
| PbO-HBr | ~0.28 resp. ~0.50 | ~0.5 resp. ~1 | −158 |

The table also states which substitution degrees S (as defined hereinbefore) appear after the exchange reaction at the surface in case of the given adsorption densities.

It is apparent from the different (approximate) figures that the adsorption and reaction of PbO with $H_2S$ and $H_2Se$ results in a slight change in the size of the lead monoxide surface. Adsoption and reaction of PbO with HCl and HBr, however, reduces the size of this surface considerably.

For the adsorption of a given quantity of reactive gas in an arrangement as described hereinbefore with reference to FIG. 1 the gas as such may be introduced under a low pressure through one of the capillaries 6 and 7 in an otherwise closed envelope 1—thus having a closed connection to the pumping system on which the envelope is placed. In case of a sufficiently strong adsorption reaction between the metal oxygen compound of the layer 13 and the reactive gas substantially the entire quantity of reactive gas is adsorbed by the layer 13 after a short period. Alternatively, the reactive gas, possibly together with an excess of an inert gas such as nitrogen, may be introduced through one or both capillaries 6 and 7 while at the same time the envelope 1 is connected to the pumping system through a passage which is not too large. For a given supply and release rate it can be experimentally determined how long the gas mixture must flow in so as to cause the layer 13 to adsorb a given quantity of reactive gas.

After the desired quantity of reactive gas is adsorbed by layer 13, a possible further supply of reactive gas is discontinued and any gas still present in envelope 1 is rapidly conducted away. The layer 13 is thus no longer exposed to the reactive gaseous compound. Due to the low temperature of the layer 13 during exposure, which temperature is obtained by means of a suitable coolant in the collar 9, an exchange reaction between the metal oxygen compound and the adsorbed reactive gas has not occurred. After any residues of the reactive gas have been removed in the manner as stated above, the temperature of the layer may be brought to a normal temperature (room temperature or slightly higher) so that an exchange reaction occurs and the oxygen-replacing element replaces oxygen atoms at the area where the reactive gas had been adsorbed. Together with the other atoms of the adsorbed compound these oxygen atoms constitute a removable gaseous oxygen compound, i.e. water vapor when using hydrogen compounds.

It is to be noted that it is desirable to subject the outer surface of the layer 13 to an oxygen ion bombardment in known manner while using a gas discharge in an oxygen atmosphere, the layer 13 itself constituting one of the electrodes of the discharge, and this prior to the envelope 1 and the layer 13 together with an electron gun and an electrode system being assembled to a camera tube of the vidicon type.

It will be readily evident that when a given combination of a metal oxygen compound and a reactive gas can yield subunilayers having increasing adsorption densities $\varphi_1, \varphi_2, \ldots$ etc., covering the surface of an outer surface-adjoining part having a thickness $p$ of a layer from the metal oxygen compound having a thickness $d$ with a subunilayer having an adsorption density $\varphi_n$ requires adsorption of a quantity M of a reactive gas which is given by the formula $$M=\frac{1}{N}\cdot G\cdot O\cdot Z\cdot\frac{W_1}{W_2}\frac{1}{r}\left[\frac{p}{d}\varphi_n+\left(1-\frac{p}{d}\right)\varphi_{n-1}\right]$$

in which

M=quantity of reactive gas to be adsorbed in grammol
N=number of molecules per grammol=$6.02\times10^{23}$
G=quantity by weight of metal oxygen compound in grams
O=surface per gram of the metal oxygen compound
Z=number of replaceable oxygen atoms of the metal oxygen compound per sq. m. of surface
$W_1$=valency of these oxygen atoms
$W_2$=valency of the oxygen-replacing element of the reactive gas
$r$=number of atoms of oxygen-replacing element per molecule of the reactive gas
$p$=thickness in $\mu$m. of that part of the layer from the metal oxygen compound which is to be provided with a subunilayer having an adsorption density $\varphi_n$
$d$=total thickness in $\mu$m. of the layer from the metal oxygen compound
$\varphi_{n-1}$=adsorption density of the subunilayer which is formed prior to the formation of the desired subunilayer having an adsorption density $\varphi_n$.($\varphi_o$=0).

Some examples of doping a layer of lead monoxide having a thickness of 20 $\mu$m. and a weight of 60 mg., which corresponds to the layer 13 described above, will now be described with reference to FIG. 1. For such a layer of lead monoxide of which the lead monoxide, as stated above, covers 40 sq. m. of surface per gram and has approximately 1.25 $10^{19}$ replaceable surface oxygen atoms per sq. m. formula 1 is reduced to $$M=5.10^{-5}\left[\frac{p}{20}\varphi_n+1\left(1-\frac{p}{20}\right)\varphi_{n-1}\right]$$

for hydrogen sulphide, hydrogen selenide and hydrogen telluride as reactive gases and $$M=10.10^{-5}\left[\frac{p}{20}\varphi_n+\left(1-\frac{p}{20}\right)\varphi_{n-1}\right]$$

for the hydrogen halides as reactive gases.

Example 1: doping with hydrogen sulphide

The supply and adsorption of hydrogen sulphide is effected at a lead monoxide layer temperature of less than —90° C., for example, —120° C. obtained by introducing melting propanol-2 as a coolant into the collar 9. After a dosed quantity of hydrogen sulphide has been adsorbed, the layer is gradually brought to room temperature and the sulphur of the adsorbed hydrogen sulphide is exchanged *in situ* with oxygen of the lead monoxide surface as is apparent from the release of an amount of water vapor which is substantially equivalent to the amount of adsorbed hydrogen sulphide.

It is found that due to adsorption of different quantities of hydrogen sulphide less than is required for the formation of a unilayer on the entire surface of the lead monoxide layer 13 (i.e. $5.10^{-5}$ gram mol $H_2S$) the layer may be given different optical absorption sides. These absorption sides may be determined by extrapolation of optical absorption coefficient determinations from transmission and reflection measurements at different wavelengths.

Whereas the optical absorption side is approximately 1.93 ev. for the untreated lead monoxide layer, an absorption side of approximately 1.45 ev., is found to occur when the quantity of adsorbed hydrogen sulphide is not more than would be required to provide the entire lead monoxide surface with a subunilayer having an adsorption density $\varphi$ of approximately 0.25, i.e. in the relevant case not more than $1.2\times10^{-5}$ gram mol $H_2S$. This optical absorption side of approximately 1.45 ev. is already found for quantities of hydrogen sulphide which are considerably less than the said quantity corresponding to an adsorption density $\varphi$ of ¼ of the entire lead monoxide surface and is not influenced by the quantity of hydrogen sulphide during this interval. For larger quantities of hydrogen sulphide, namely quantities required for coating the entire lead monoxide surface with a subunilayer having an adsorption density $\varphi$ of approximately 0.50 (thus in this case approximately $2.5\times10^{-5}$ gram mol $H_2S$) a new optical absorption side of approximately 1.05 ev. appears in addition to the optical absorption side of 1.45 ev. ever decreasing in significance. For quantities of adsorbed hydrogen sulphide of more than those corresponding to an adsorption density of approximately 0.50 an absorption side at approximately 0.85 ev. is found. It is the latter absorption side which, irrespective of the quantity of adsorbed hydrogen sulphide, occurs immediately when the lead monoxide is caused to adsorb hydrogen sulphide at a temperature of more than —90° C., for example, room temperature. The occurrence of the different optical absorption sides as a function of the quantity of hydrogen sulphide adsorbed at a temperature of less than —90° C. is shown graphically in FIG. 2. In this Figure the optical absorption sides found (expressed in ev.) are stated as a function of the quantity of adsorbed hydrogen sulphide expressed in an average adsorption density $\bar{\varphi}$ (and consequently made independent of the measurements and weight of the lead monoxide layer). The average adsorption density $\bar{\varphi}$ is the adsorption density which would be obtained when the adsorbed hydrogen sulphide is evenly distributed over the entire lead monoxide surface.

The latter is, however, not the case for a great many examples. It may be assumed that for quantities of adsorbed hydrogen sulphide less than those corresponding to an average adsorption degree $\bar{\varphi}$ of approximately 0.25 a subunilayer having a local adsorption density $\bar{\varphi}$ of approximately 0.25 is formed on the lead monoxide surface, which subunilayer extends from the outer surface of the layer 13 (which is the surface of this layer remote from the signal electrode 11) into the direction of thickness of the layer over a distance which is proportional to the adsorbed quantity of hydrogen sulphide, while the surface of the lead monoxide which is located deeper remains uncoated. When more hydrogen sulphide is adsorbed, a subunilaryer having a density $\varphi$ of approximately 0.50 is apparently built up from the outer surface and deeper into the layer after the entire lead monoxide surface has been coated with a subunilayer of $\varphi$ of approximately 0.25. Once the entire surface is coated with this subunilayer having an adsorption density $\varphi$ of approximately 0.50, further adsorption of hydrogen sulphide, starting from the outer surface, results in a further increase of the surface area having $H_2S$ adsorbed thereon. The occurrence of different subunilayers having discrete adsorption densities may explain the occurrence of different discrete optical adsorption sides shown in FIG. 2. It is also apparent that for an adsorption of less hydrogen sulphide than corresponds to an average adsorption density $\bar{\varphi}$ of approximately 0.25 the PbO layer 13, after having been broken at room temperature, is found to have on the face of the fracture a portion adjoining the outer surface which portion is more darkly colored than the original lead monoxide, while the remaining portion maintains the color of the original lead monoxide. The distance through which the darkly colored part extends in the direction of thickness of the layer is found to be proportional to the quantity of hydrogen sulphide which is adsorbed by the layer at the said low temperature.

By treating the layer 13 in the manner described above with a quantity of hydrogen sulphide which is less than is required for an average adsorption density $\bar{\varphi}$ of approximately 0.25 or an average adsorption density $\bar{\varphi}$ of approximately 0.50 this layer can be made into a target plate for a camera tube of the vidicon type having a sensitivity limit which, as compared with untreated lead monoxide, has shifted to approximately 8500 A. and 12,000 A., respectively. The shift of the sensitivity limit extending far into infrared as found in lead monoxide target plates treated at room temperature is thus avoided.

A sensitivity limit shifted to approximately 8500 A. is generally sufficient. This is achieved at such a hydrogen sulphide adsorption that the average adsorption density $\bar{\varphi}$ is not more than 0.25.

To benefit from the shifted sensitivity limit it is not necessary that the last formed subunilayer, thus the subunilayer having the highest adsorption density, extends throughout the thickness of the lead monoxide layer. It is generally sufficient when the relevant subunilayer extends from the outer surface of the layer 13 over a distance of not more than 4 $\mu$m. For a target plate 13 having a sensitivity limit of approximately 8500 A. (absorption side 1.45 ev.) it is then sufficient to adsorb a quantity of hydrogen sulphide corresponding to approximately $4/d$ times the quantity which is required for obtaining an average adsorption density $\bar{\varphi}$ of approximately 0.25, in which $d$ represents the thickness of the lead monoxide layer in $\mu$m. For a lead monoxide layer having a thickness and weight as stated above, this results in an adsorption for the layer of approximately $2\times10^{-6}$ gram mol $H_2S$.

To realize a sensitivity limit of approximately 12,000 A. (optical absorption side 1.05 ev.) by means of a subunilayer likewise extending over 4 $\mu$m. and having an adsorption density $\varphi$ of approximately 0.50 a quantity of hydrogen sulphide is to be adsorbed which is equal to $4/d$ times the quantity which is required for obtaining an average adsorption density $\bar{\varphi}$ of approximately 0.50 plus $d-4/d$ times the quantity required for obtaining an average adsorption density $\varphi$ of approximately 0.25 throughout the lead monoxide surface. In fact, it is necessary to form a subunilayer having a density $\varphi$ of approximately 0.50 over the first $4/d$-portion of the target plate and a subunilayer of approximately $0.25\varphi$ over the remaining portion thereof.

For the above-described combination of lead monoxide and hydrogen sulphide it can be calculated that for an average adsorption degree $\bar{\varphi}$ of 0.25 there are required $21.10^{-5}$ grammol $H_2S$ per gram of PbO and for an average adsorption density $\varphi$ of 0.50 approximately $43.10^{-5}$ gram mol $H_2S$ per gram of PbO.

Example 2: Doping with hydrogen selenide

In this case hydrogen selenide is applied to the lead monoxide layer 13 for the purpose of adsorption while the layer is maintained at a temperature of less than $-155°$ C. Likewise as for the adsorption of hydrogen sulphide, adsorption of hydrogen selenide at a sufficiently low temperature leads to the successive formation of subunilayers having discrete adsorption densities $\varphi$ of approximately 0.25 and approximately 0.50, respectively. The required quantities of hydrogen selenide can be calculated in the same manner as applies to the equal formation of subunilayers with hydrogen sulphide. For example, adsorption of approximately $2\times10^{-6}$ gram mol $H_2Se$ on the lead monoxide layer 13 of the given thickness and the given weight leads to the formation of a subunilayer having a $\varphi$ of approximately 0.25 which extends up to a distance of approximately 4 $\mu$m. from the outer surface in the direction of thickness of the layer. The layer has an optical absorption side of approximately 1 ev. after the reaction.

Example 3. Doping with hydrochloric acid or hydrobromic acid

Although all hydrogen halides in combination with lead monoxide can constitute subunilayers in case of adsorption at sufficiently low temperatures, hydrochloric acid and hydrobromic acid are most suitable.

Whereas adsorption at a normal temperature such as room temperature leads immediately to the formation of a unilayer or to an even greater adsorption density, adsorption densities of approximately 0.28 and 0.5 can be obtained with hydrochloric acid at a temperature of less than $-170°$ C. and with hydrobromic acid at a temperature of less than $-158°$ C., respectively. For the formation of a subunilayer having the last-mentioned adsorption density ($\varphi$ about 0.5) it is not necessary that the adsorption of all hydrochloric or hydrobromic acid is effected at the previously stated low temperature. When first of all a quantity is adsorbed which coats the entire lead monoxide surface with a subunilayer having an adsorption density of approximately 0.28, further adsorption of hydrochloric or hydrobromic acid required to provide a part of or the entire lead monoxide layer with a subunilayer having an adsorption density of approximately 0.5 can be effected without any objection at a higher temperature.

The quantities of hydrochloric acid and hydrobromic acid required for coating the lead monoxide in a given manner can be simply calculated from the data mentioned hereinbefore. For the lead monoxide layer 13 having a thickness of 20 $\mu$m. and a weight of 60 mg. approximately $2.8\times10^{-5}$ gram mol of hydrochloric or hydrobromic acid is required for an adsorption density of approximately 0.28 throughout the surface.

Treatment with hydrochloric or hydrobromic acid does not result in a shift of the optical absorption side to a longer wavelength. However, the reactivity of the lead monoxide surface is reduced so that there is less risk of harmful influence on the layer by gases to which the layer may be exposed during transport or when used as a photoconducting layer. A further advantage is that a layer thus treated can be provided with a subunilayer of a hydrogen compound shifting the limit sensitivity without using the otherwise required low temperature, as is apparent.

Example 4: combined doping

Firstly a layer of lead monoxide 13 is doped as described above at a low temperature with a quantity of hydrochloric acid or hydrobromic acid so that a subunilayer having an adsorption density of approximately 0.5 is formed, which extends from the outer surface of the layer 13 into the direction of its thickness over a distance of at least 4 $\mu$m. The quantity of hydrochloric acid or hydrobromic acid may be chosen to be such that the entire lead monoxide surface is coated with the same subunilayer. After adsorption of hydrochloric or hydrobromic acid the layer is gradually brought to room temperature so that chlorine atoms or bromine atoms replace oxygen atoms at the lead monoxide surface. It is found that it is possible to form subunilayers of the hydrogen compounds of sulphur, selenium and tellurium on the lead monoxide surface already doped with chlorine or bromine without having to maintain the temperature so low at the adsorption of these hydrogen compounds as is the case when hydrochloric or hydrobromic acid has not been adsorbed previously thereto. The adsorption of, for example, hydrogen sulphide can then be effected at room temperature and nevertheless result in a subunilayer thereof having an adsorption density of approximately 0.25. Actually, it is only possible by previous doping with chlorine or bromine to form a subunilayer of hydrogen telluride which cannot substantially be achieved in the case of untreated lead monoxide because then such a low temperature of the lead monoxide is required that hydrogen telluride no longer has any noticeable vapor pressure.

It is to be noted that when the entire lead monoxide surface is not doped in advance with chlorine or bromine the adsorption of, for example, hydrogen sulphide at room temperature may give rise to the formation of an unilayer on the uncovered surface, i.e. the surface not having chlorine or bromine adsorbed thereon. In such a case the adsorption of hydrogen sulphide is to be effected at the previously mentioned low temperature, unless the applied quantity of hydrogen sulphide is not sufficient to be adsorbed any farther than by the doped surface.

By adsorbing firstly hydrochloric acid by the lead monoxide at a low temperature and subsequently hydrogen sulphide at room temperature and subsequently hydrogen tained from the latter having adsorption densities of from 0.3 to 0.4 and approximately 0.7 calculated on the original lead monoxide surface. The layers thus obtained have an optical absorption side of 1.6 to 1.7 ev. and 1.2 ev., respectively.

After previous adsorption of hydrobromic acid in such a manner that a subunilayer thereof is formed on the lead monoxide, adsorption of a suitably measured quantity of hydrogen sulphide may lead to a subunilayer thereof having an adsorption density of approximately 0.3. The lead monoxide layer thus treated then has an optical absorption side of from 1.7 to 1.8 ev.

When lead monoxide initially treated at a low temperature with hydrobromic acid is treated at room temperature with a suitably measured quantity of hydrogen selenide, it is possible to obtain subunilayers of hydrogen selenide having adsorption densities of approximately 0.3 and of approximately 0.5, respectively. Lead monoxide layers thus treated have an optical absorption side of approximately 1.5 and approximately 1.2 ev., respectively. All these layers are consequently suitable for use as target plates in camera tubes of the vidicon type having a sensitivity which, as compared with a lead monoxide target plate not thus treated, is shifted to red. The layers treated in a combined manner as described hereinbefore which have an optical absorption side of approximately 1.7 ev. yield optimum matching to the acuity curve. Such a target plate can therefore be obtained by adsorbing $2.8\times10^{-5}$ gram mol hydrochloric acid at $-170°$ C. by the lead monoxide layer 13 mentioned above with its thickness and weight, or by adsorbing the same quantity of hydrobromic acid at $-158°$ C. and subsequently by adsorbing approximately $3\times10^{-6}$ gram mol hydrogen sulphide at room temperature. The subunilayer of hydrogen sulphide is then formed from the outer surface of the lead monoxide layer over a distance of approximately 4 μm., in the direction of thickness of the layer.

A lead monoxide layer treated in a combined manner as described in this example may be shown diagrammatically in the manner as illustrated in FIG. 3. In this Figure the local adsorption density $\varphi$ of hydrochloric or hydrobromic acid and, for example, of hydrogen sulphide is plotted as a function of the location in the lead monoxide layer, that is to say, the distance $p$ up to the outside surface of the layer which has a thickness $d$. It can be seen that a subunilayer of hydrochloric or hydrobromic acid having an adsorption density of approximately 0.28 is adsorbed on the lead monoxide up to a depth of $p_1$ and that a subunilayer of hydrogen sulphide having an adsorption density of approximately 0.3 is adsorbed on the thus doped lead monoxide up to a depth of $p_2$ smaller than $p_1$. Provided that $p_2$ remains less than $p_1$, the depths $p_1$ and $p_2$ are proportional to the adsorbed quantities of hydrochloric acid or hydrobromic acid and hydrogen sulphide, respectively.

Lead monoxide is used throughout the above-mentioned examples as a material for the layer to be doped in the manner stated. However, other metal oxides can be entirely or partly provided with a subunilayer at a temperature at which the adsorbed gas is not decomposed.

For example, at a temperature of less than −60° C. an antimony trioxide layer can be provided with a subunilayer of hydrogen sulphide whose adsorption density is approximately 0.5. After such an adsorption at a low temperature, the substitution degree is found to be substantially ½ upon bringing to room temperature.

What is claimed is:

1. A method of making a photoconductive target for a television camera tube having increased sensitivity in the near infrared comprising the steps of vapor-depositing a porous layer of lead monoxide on a support, exposing the surface of the lead monoxide layer to at least one reactive gas consisting of a gaseous compound consisting of hydrogen and an element selected from the group consisting of iodine, fluorine, sulfur, selenium and tellurium to adsorb on said lead monoxide layer at least one layer of said reactive gas having an adsorption density not greater than 1 while maintaing said lead monoxide layer at a temperature at which said gas adsorbed by the lead monoxide does not decompose, and thereafter raising the temperature of said lead monoxide layer to decompose the adsorbed gas thereby releasing oxygen by the reaction of said element with the lead monoxide.

2. A method as claimed in claim 1 wherein the reactive gas is hydrogen sulphide and the temperature at which the gas is adsorbed by the lead monoxide is lower than −90° C.

3. A method as claimed in claim 1 wherein the reactive gas is hydrogen selenide and the temperature at which the gas is adsorbed by the lead monoxide is less than −155° C.

4. A method as claimed in claim 1 wherein the quantity of reactive gas to which the lead monoxide layer is exposed is between approximately 25% and approximately 50% of the quantity which is sufficient to coat the entire lead monoxide surface with a unilayer.

5. A method as claimed in claim 1 wherein the quantity of reactive gas to which the layer of lead monoxide is exposed amounts to not more than approximately 25% of the quantity which is sufficient to coat the entire lead monoxide surface with a unilayer.

6. A method as claimed in claim 5, wherein the monoxide layer is exposed to a quantity of reactive gas which is not more than $$\frac{4}{d}\times 25\%$$

of the quantity which is sufficient to coat the entire lead monoxide surface with a unilayer, in which $d$ represents the thickness of the layer of at least 4 μm.

7. A method as claimed in claim 1 wherein the lead monoxide layer is exposed to a first reactive gas atmosphere consisting of a gaseous compound consisting of hydrogen and one of said elements and is subsequently exposed to a second reactive gas atmosphere consisting of a gaseous compound consisting of hydrogen and one of said elements different from the element in said first reactive gas, the quantity of each of the two reactive gases being less than is exactly required for the formation of a unilayer on the surface of the lead monoxide, wherein the temperature of the lead monoxide layer upon its exposure to the first reactive gas is so low that the compound being adsorbed on the layer is not decomposed.

8. A method as claimed in claim 7, wherein the temperature of the lead monoxide layer upon its exposure to the second gaseous compound is so low that this compound is adsorbed on the lead monoxide without being decomposed.

9. A method as claimed in claim 7 wherein the lead monoxide is exposed at a temperature of less than −158° C. to hydrobromic acid, the quantity of hydrobromic acid taken up by the lead monoxide surface being not more than half the quantity which is required to provide the entire lead monoxide surface with a unilayer and subsequently exposing the layer to hydrogen sulphide the quantity of hydrogen sulphide adsorbed being not more than approximately 30% of the quantity which would have been required to provide the entire original lead monoxide surface with a unilayer.

10. A method as claimed in claim 7 wherein the lead monoxide is exposed at a temperature of less than −90° C. to gaseous hydrochloric acid, the quantity of hydrochloric acid to which lead monoxide is exposed being not more than half the quantity which is required to provide the entire lead monoxide surface with a unilayer, subsequently exposing the layer to hydrogen sulphide, the quantity of hydrogen sulphide adsorbed being not more than 40% of the quantity which would have been required to provide the entire original lead monoxide surface with a unilayer.

References Cited

UNITED STATES PATENTS

| | | | |
|---|---|---|---|
| 3,372,056 | 3/1968 | De Haan et al. ---- | 117—106 R |
| 3,396,053 | 8/1968 | Tojo ------------ | 117—106 R |

CAMERON K. WEIFFENBACH, Primary Examiner

U.S. Cl. X.R.

117—62, 106 R, 118, 211